US012603283B2

(12) United States Patent
Li et al.

(10) Patent No.: US 12,603,283 B2
(45) Date of Patent: Apr. 14, 2026

(54) POSITIVE ELECTRODE SLURRY, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Cheng Li, Ningde (CN); Huihui Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 232 days.

(21) Appl. No.: 18/600,785

(22) Filed: Mar. 11, 2024

(65) Prior Publication Data

US 2024/0258520 A1 Aug. 1, 2024

Related U.S. Application Data

(63) Continuation of application No. PCT/CN2022/097969, filed on Jun. 9, 2022.

(51) Int. Cl.
*H01M 4/58* (2010.01)
*H01M 4/02* (2006.01)
*H01M 4/62* (2006.01)
*H01M 10/052* (2010.01)

(52) U.S. Cl.
CPC ......... *H01M 4/5825* (2013.01); *H01M 4/622* (2013.01); *H01M 4/625* (2013.01); *H01M 10/052* (2013.01); *H01M 2004/028* (2013.01)

(58) Field of Classification Search
CPC .... H01M 4/131; H01M 4/5825; H01M 4/622; H01M 4/136; H01M 4/1397; H01M 4/525; H01M 4/625; H01M 10/0525
See application file for complete search history.

(56) References Cited

U.S. PATENT DOCUMENTS

2015/0050555 A1* 2/2015 Fukumine ........... H01M 10/052
429/217
2020/0343555 A1 10/2020 Kuo et al.
2021/0189037 A1* 6/2021 Pan ....................... H01M 4/136

FOREIGN PATENT DOCUMENTS

| CN | 106220779 A | 12/2016 |
|----|-------------|---------|
| CN | 114094165 A | 2/2022 |
| CN | 114597412 A | 6/2022 |
| JP | 2004-079327 A | 3/2004 |
| JP | 2005310658 A | 11/2005 |
| JP | 2018523281 A | 8/2018 |

(Continued)

OTHER PUBLICATIONS

International Search Report received in the corresponding international application PCT/CN2022/097969, mailed Feb. 27, 2023, 5 pages.

(Continued)

*Primary Examiner* — Karie O'Neill Apicella
(74) *Attorney, Agent, or Firm* — K&L Gates LLP

(57) ABSTRACT

Provided is a positive electrode slurry, a secondary battery, a battery module, a battery pack and a power consuming device. The positive electrode slurry comprises a positive electrode active substance, a conductive agent and a binder, wherein the binder comprises a polymer A, and the polymer A comprises a structural unit derived from a monomer containing a cyano group, a structural unit derived from a monomer containing an amide group, and a structure unit derived from a monomer containing an ester group. In the present invention, the polymer A is used as the binder of the positive electrode slurry, such that the stability and processability of the positive electrode slurry are improved, and the adhesive force of the positive electrode plate is increased.

16 Claims, 3 Drawing Sheets

(56)                    References Cited

FOREIGN PATENT DOCUMENTS

JP          2019526693  A      9/2019
KR          20190045209  A     5/2019
WO          2013129658  A1     7/2015
WO          2018056083  A1     7/2019

OTHER PUBLICATIONS

Written Opinion of ISA received in the corresponding international application PCT/CN2022/097969, mailed Feb. 27, 2023, 8 pages.
2nd Office Action with English Machine Translation, dated Jul. 17, 2025, for corresponding Chinese Patent Application Serial No. 202280060320.9.

Extended European Search Report, mailed May 22, 2025, for corresponding European Patent Application Serial No. 22937664.5.
Decision to Grant (Notice of Allowance), with English Machine Translation, dated Aug. 5, 2025, for corresponding Japanese Patent Application No. 2023-569611.
1st Office Action with English Machine Translation, dated Jul. 29, 2025, for corresponding Korean Patent Application No. 10-2023-7038912.
Office Action issued to related JP Application No. 2023-569611, dated Jan. 21, 2025, 10 pages (with English translation).
Office Action issued to related CN Application No. 202280060320.9, dated Jan. 27, 2025, 19 pages (with English translation).
Notice of Allowance (with English Machine Translation), mailed Sep. 15, 2025, for corresponding Chinese Patent Application Serial No. 202280060320.9.

* cited by examiner

5

5

53

52
52

51

POSITIVE ELECTRODE SLURRY, SECONDARY BATTERY, BATTERY MODULE, BATTERY PACK AND POWER CONSUMING DEVICE

CROSS REFERENCE TO RELATED MATTER

This application is a continuation of international application PCT/CN2022/097969, filed Jun. 9, 2022 and entitled "POSITIVE ELECTRODE SLURRY, SECONDARY BATTERY, BATTERY MODULE, BATTERY PACK AND POWER CONSUMING DEVICE", the entire content of which is hereby incorporated by reference in its entirety.

TECHNICAL FIELD

The present application relates to the technical field of lithium batteries, and in particular to a positive electrode slurry, a secondary battery, a battery module, a battery pack and a power consuming device.

BACKGROUND ART

In recent years, lithium ion batteries have been widely used in energy storage power systems such as hydroelectric, thermal, wind and solar power plants, as well as electric tools, electric bicycles, electric motorcycles, electric vehicles, military equipment, aerospace and other fields. With the popularization of lithium ion battery application, higher requirements have been placed in terms of both their performances and costs.

The existing traditional binder PVDF, as a commonly used binder, has problems such as poor compatibility and weak adhesive force with an electrode active material, resulting in poor stability and difficult processability during coating of a positive electrode slurry using it as a binder, so it is urgently needed to develop a novel binder and a positive electrode slurry.

SUMMARY OF THE INVENTION

The present application has been made in view of the above problems, and an objective of the present application is to provide a positive electrode slurry with good stability and processability and strong adhesive force.

A first aspect of the present invention provides a positive electrode slurry, comprising a positive electrode active substance, a conductive agent and a binder, wherein the binder comprises a polymer A, and the polymer A comprises a structural unit derived from a monomer containing a cyano group, a structural unit derived from a monomer containing an amide group, and a structure unit derived from a monomer containing an ester group.

In the present application, a polymer A comprising a structural unit derived from a monomer containing a cyano group, a structural unit derived from a monomer containing an amide group and a structural unit derived from a monomer containing an ester group is used as a binder in a positive electrode slurry, such that the stability and processability of the positive electrode slurry are improved, and the adhesive force of the positive electrode plate is increased.

There are abundant polar groups in the polymer A, such as the cyano group located in the main chain segment of the polymer A, due to the dipole interaction between the cyano group and the electronegativity of the positive electrode current collector, the polymer A has a strong adhesion on the current collector, which increases the adhesive force of the electrode plate, and avoids processing abnormalities such as demolding and powder dropping of the electrode plate during coating or cold pressing. In addition, the ester-containing functional group has a certain ability to absorb and maintain the electrolyte solution, which can solve the problem of poor ion conductivity of the traditional binder, i.e., pure polyvinylidene fluoride only. Furthermore, the abundant groups on the polymer A can increase the compatibility of the polymer A with various positive electrode active substances, and increase the versatility of the polymer A as a binder.

In any embodiment, the binder comprises a polymer A with a weight average molecular weight of $7\times10^5$-$1\times10^6$. The control of the weight average molecular weight of the polymer A can further reduce the growth rate of the cyclic internal resistance of the battery while increasing the stability and processability of the positive electrode slurry and the adhesive force of the positive electrode plate.

In any embodiment, the binder also comprises a polymer A with a weight average molecular weight of $1\times10^5$-$2.5\times10^5$. The polymer A with a weight average molecular weight of $1\times10^5$-$2.5\times10^5$ acts as a dispersant in the positive electrode slurry, and its addition further increases the stability and processability of the slurry and the adhesive force of the electrode plate, and reduces the growth rate of the cyclic internal resistance of the battery.

In any embodiment, the mass content of the polymer A with a weight average molecular weight of $7\times10^5$-$1\times10^6$ is 0.4%-5.5%, based on the total mass of the positive electrode active substance, the conductive agent and the binder. The polymer A with a weight average molecular weight of $7\times10^5$-$1\times10^6$ within this mass content range can increase the stability and processability of the slurry and the adhesion of the electrode plate, and greatly reduce the growth rate of the cyclic internal resistance of the battery at the same time.

In any embodiment, the mass content of the polymer A with a weight average molecular weight of $1\times10^5$-$2.5\times10^5$ is 0.05%-0.5%, based on the total mass of the positive electrode active substance, the conductive agent and the binder. The polymer A with a weight average molecular weight of $1\times10^5$-$2.5\times10^5$ within this mass content range can further increase the stability and processability of the slurry and the adhesive force of the electrode plate, and greatly reduce the growth rate of the cyclic internal resistance of the battery at the same time.

In any embodiment, the monomer containing a cyano group is selected from one or more of acrylonitrile and crotonitrile.

In any embodiment, the monomer containing an amide group is selected from one or more of methacrylamide, N-methyl methacrylamide, N-ethyl methacrylamide, N-n-propyl methacrylamide, N-isopropyl methacrylamide, N-n-butyl methacrylamide, N-isobutyl methacrylamide, N,N-dimethyl acrylamide, N,N-dimethyl methacrylamide, N,N-diethyl acrylamide, and N,N-diethyl methacrylamide.

In any embodiment, the monomer containing an ester group is selected from one or more of methyl acrylate, ethyl acrylate, butyl acrylate, isoamyl acrylate, isooctyl acrylate, methyl methacrylate, ethyl methacrylate, hydroxyethyl acrylate and hydroxypropyl acrylate.

The above materials are simple and easy to obtain, which can significantly reduce the manufacturing cost of the binder.

In any embodiment, in the polymer A, the molar content of the structural unit derived from a monomer containing a cyano group is 50%-60%, the molar content of the structural unit derived from a monomer containing an ester group is 10%-20%, and the molar content of the structural unit derived from a monomer containing an amide group is 20%-30%, based on the total molar content of the structural units in the polymer A.

In any embodiment, the positive electrode active substance is a lithium-containing transition metal oxide, which is optionally lithium ferrous phosphate, or doped and modified materials thereof, or at least one of conductive carbon-coated modified materials, conductive metal-coated modified materials, and conductive polymer-coated modified materials thereof or mixtures thereof with other transition metal oxides containing lithium.

The polymer A contains groups with good affinity for carbon materials with high degree of graphitization, such as N-containing groups (cyano group, amide group, etc.), oxygen-containing groups (ester group, amide group, etc.), so as to effectively increase the wettability of lithium iron phosphate powder in solvents (such as N-methylpyrrolidone), thereby improving the stability and processing performance of the positive electrode slurry.

In any embodiment, the mass content of the positive electrode active substance is 70%-99.5%, and optionally 88.0%-99.5%, based on the total mass of the positive electrode active substance, the conductive agent and the binder.

In any embodiment, the conductive agent is selected from one or more of superconducting carbon, acetylene black, carbon black, Ketjen black, carbon dots, carbon nanotubes, graphene, and carbon nanofibers.

In any embodiment, the mass content of the conductive agent is 0.2%-6.0%, based on the total mass of the positive electrode active substance, the conductive agent and the binder.

A second aspect of the present application provides a secondary battery, comprising an electrode assembly and an electrolyte solution. The electrode assembly comprises a positive electrode plate, a separator and a negative electrode plate. The positive electrode plate is prepared from a positive electrode slurry of the first aspect of the present application.

A third aspect of the present application provides a battery module, comprising a secondary battery of the second aspect of the present application.

A fourth aspect of the present application provides a battery pack, comprising a battery module of the third aspect of the present application.

A fifth aspect of the present application provides a power consuming device, comprising at least one of a secondary battery of the second aspect of the present application, a battery module of the third aspect of the present application or a battery pack of the fourth aspect of the present application.

LIST OF REFERENCE NUMERALS

Figures 1, 2:
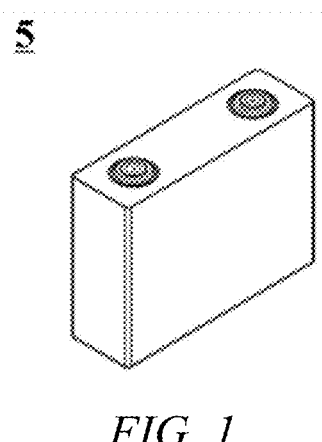
FIG. 1 is a schematic diagram of a secondary battery according to an embodiment of the present application.
FIG. 2 is an exploded view of a secondary battery according to an embodiment of the present application as shown in FIG. 1.

1—battery pack; 2—upper case body; 3—lower case body; 4—battery module; 5—secondary battery; 51—housing; 52—electrode assembly; 53—top cover assembly; 6—electrode plate; 61—current collector; 62—coating on current collector; 7—double-sided tape; 8—steel plate.

DETAILED DESCRIPTION OF EMBODIMENTS

Hereafter, embodiments of the binder and preparation method therefor, the electrode, the battery and the power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in the claims.

The "ranges" disclosed in the present application are defined in the form of lower and upper limits. A given range is defined by selecting a lower limit and an upper limit, and the selected lower and upper limits defining the boundaries of the particular range. Ranges defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer $\geq 2$, it is equivalent to disclosing that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application may be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

A positive electrode active substance of lithium iron phosphate has attracted extensive attention in the industry due to its low cost, high performance and safety. However, the lithium iron phosphate positive electrode active substance has the characteristics of large specific surface area, small particle size, large amount of carbon coating on the surface after carbon coating, and high degree of graphitization, such that a slurry with lithium iron phosphate as the positive electrode active substance and a traditional binder PVDF as the binder is poor in dispersibility, easy to precipitate, high in viscosity, and low in solid content, and the surface of the electrode plate prepared therefrom is prone to defects such as cracking, demolding, particle scratches, and pinholes, and the distribution of the positive electrode active substance in the electrode plate is non-uniform and the quality of the electrode plate is inhomogenous.

[Positive Electrode Slurry]

On this basis, the present application proposes a positive electrode slurry for a battery, comprising a positive electrode active substance, a conductive agent and a binder, wherein the binder comprises a polymer A, and the polymer A comprises a structural unit derived from a monomer containing a cyano group, a structural unit derived from a monomer containing an amide group, and a structure unit derived from a monomer containing an ester group.

Herein, the term "binder" refers to a chemical compound, polymer or mixture that forms a colloidal solution or a colloidal dispersion in a dispersion medium.

Herein, the term "polymer" involves, on the one hand, the aggregate of macromolecules that are chemically homogeneous but are different in the degree of polymerization, molar mass and chain length, which is prepared by polymerization reaction. On the other hand, the term also includes derivatives of such aggregates of macromolecules formed by polymerization, that is, compounds or mixtures that can be obtained by the reaction of functional groups in the above macromolecules, such as addition or substitution, and can be chemically homogeneous or chemically heterogeneous.

Herein, the term "positive electrode" also refers to a "cathode" in a secondary battery.

Herein, the term "cyano group" refers to a —CN group.

Herein, the term "amide group" refers to a —CONH group.

Herein, the term "ester group" refers to a —COOR$_1$ group, wherein R$_1$ is selected from C$_{1-9}$ alkyl unsubstituted or substituted by substituents.

Herein, the substituents in the term "substituted by substituents" are each independently selected from: hydroxyl, mercapto, amino, cyano, nitro, aldehyde, halogen atoms, alkenyl, alkynyl, aryl, heteroaryl, C$_{1-6}$ alkyl, and C$_{1-6}$ alkoxy.

Herein, the term "C$_{1-6}$ alkyl" refers to a straight or branched hydrocarbon chain radical that is composed of carbon and hydrogen atoms only without unsaturation, has one to five carbon atoms, and is attached to the rest of the molecule via a single bond. The term "C$_{1-9}$ alkyl" should be explained accordingly. Examples of C$_{1-6}$ alkyl include, but are not limited to: methyl, ethyl, n-propyl, 1-methylethyl (isopropyl), butyl, and pentyl.

Herein, the term "polymer A" refers to a polymer comprising a structural unit derived from a monomer containing a cyano group, a structural unit derived from a monomer containing an amide group, and a structure unit derived from a monomer containing an ester group.

In some embodiments, the polymer A is soluble in an oily solvent. In some embodiments, the polymer A is soluble in an aqueous solvent. Examples of the oily solvent include, but are not limited to, dimethylacetamide, N,N-dimethylformamide, N-methylpyrrolidone, acetone, dimethyl carbonate, ethyl cellulose, and polycarbonate.

Examples of the aqueous solvent include, but are not limited to water. It can be understood that the structural units in the polymer A may be in any proportion, the polymer A can have different molecular weights, and the polymer A can be prepared by different methods, such as suspension method and emulsion method.

In some embodiments, the positive electrode slurry comprises a dispersion medium. In some embodiments, the dispersion medium of the positive electrode slurry is an oily solvent. In some embodiments, the dispersion medium of the positive electrode slurry is an aqueous solvent.

In some embodiments, the binder is used to bind the positive electrode active substance and/or the conductive agent together to form a slurry, and can fix them in place and adhere them to the conductive metal parts to form positive electrode.

In some embodiments, the polymer A is one or more of acrylonitrile-acrylamide-methyl acrylate copolymers, acrylonitrile-acrylamide-ethyl acrylate copolymers, acrylonitrile-acrylamide-propyl acrylate copolymers, and acrylonitrile-acrylamide-isooctyl acrylate copolymers.

In the present application, a polymer comprising a structural unit derived from a monomer containing a cyano group, a structural unit derived from a monomer containing an amide group and a structural unit derived from a monomer containing an ester group is used as a binder in a positive electrode slurry, such that the stability and processability of the positive electrode slurry are improved, and the adhesive force of the positive electrode plate is increased.

There are abundant polar groups in the polymer A, such as the cyano group located in the main chain segment of the polymer A, due to the dipole interaction between the cyano group and the electronegativity of the positive electrode current collector, the polymer A has a strong adhesion on the current collector, which increases the adhesive force of the electrode plate, and avoids processing abnormalities such as demolding and powder dropping of the electrode plate during coating or cold pressing. In addition, the ester-containing functional group in the polymer A has a certain ability to absorb and maintain the electrolyte solution, which can solve the problem of poor ion conductivity of the traditional binder, i.e., pure polyvinylidene fluoride only. Furthermore, the abundant groups on the polymer A can increase the compatibility of the polymer A with various positive electrode active substances, and increase the versatility of the polymer A as a binder.

In some embodiments, the binder comprises a polymer A with a weight average molecular weight of $7\times10^5$-$1\times10^6$. In some embodiments, the weight average molecular weight of the polymer A is optionally $7\times10^5$-$9.5\times10^5$, or $7\times10^5$-$9\times10^5$, or $7\times10^5$-$8.5\times10^5$, or $7\times10^5$-$8\times10^5$, or $7.5\times10^5$-$1\times10^6$, or $8\times10^5$-$1\times10^6$, or $8.5\times10^5$-$1\times10^6$, or $9\times10^5$-$1\times10^6$, or $9.5\times10^5$-$1\times10^6$.

Herein, the term "weight average molecular weight" refers to the sum of the weight fractions of molecules with different molecular weights in a polymer multiplied by the corresponding molecular weight thereof.

The control of the weight average molecular weight of the polymer A can further reduce the growth rate of the cyclic internal resistance of the battery while increasing the stability and processability of the positive electrode slurry and the adhesive force of the positive electrode plate.

In some embodiments, the binder also comprises a polymer A with a weight average molecular weight of $1\times10^5$-$2.5\times10^5$. In some embodiments, the weight average molecular weight of the polymer A is optionally $1.5\times10^5$-$2.5\times10^5$, or $2\times10^5$-$2.5\times10^5$, or $1\times10^5$-$2\times10^5$, or $1\times10^5$-$1.5\times10^5$.

Due to the large specific surface area and many small particles of some positive electrode active substances (such as lithium ferrous phosphate LFP), the slurry is easy to agglomerate in the preparation process, which further leads to the blockage of the filter screen. By using a polymer A with lower weight average molecular weight in the slurry, the agglomeration between positive electrode active substances (such as lithium ferrous phosphate LFP powder particles) can be avoided by means of their electrostatic repulsion or steric hindrance; at the same time, it can disperse and suspend other small molecular substances in the slurry, so that the slurry does not settle after being placed for a short time and its stability is increased. In addition, the polymer A with a low weight average molecular weight has a low glass transition temperature, which can further increase the flexibility of the electrode plate.

The polymer A with a weight average molecular weight of $1\times10^5$-$2.5\times10^5$ acts as a dispersant in the positive electrode slurry, and its addition further increases the stability and processability of the slurry and the adhesive force of the electrode plate, and reduces the growth rate of the cyclic internal resistance of the battery.

In some embodiments, the mass content of the polymer A with a weight average molecular weight of $7\times10^5$-$1\times10^6$ is 0.4%-5.5%, based on the total mass of the positive electrode active substance, the conductive agent and the binder. If the polymer A with a weight average molecular weight of $7\times10^5$-$1\times10^6$ is added too much, the power performance and cycling performance of the battery will be reduced. The polymer A with a weight average molecular weight of $7\times10^5$-$1\times10^6$ within this mass content range can increase the stability and processability of the slurry and the adhesion of the electrode plate, and greatly reduce the growth rate of the cyclic internal resistance of the battery at the same time.

In some embodiments, the mass content of the polymer A with a weight average molecular weight of $1\times10^5$-$2.5\times10^5$ is 0.05%-0.5%, based on the total mass of the positive electrode active substance, the conductive agent and the binder.

If the polymer A with a weight average molecular weight of $1\times10^5$-$2.5\times10^5$ is added too much, it will increase the swelling of the electrode plate and affect the power performance of the battery at room temperature. The polymer A with a weight average molecular weight of $1\times10^5$-$2.5\times10^5$ within this mass content range can further increase the stability and processability of the slurry and the adhesive force of the electrode plate, and greatly reduce the growth rate of the cyclic internal resistance of the battery at the same time.

In some embodiments, the monomer containing a cyano group is selected from one or more of acrylonitrile and crotonitrile.

In some embodiments, the monomer containing an amide group is selected from one or more of methacrylamide, N-methyl methacrylamide, N-ethyl methacrylamide, N-n-propyl methacrylamide, N-isopropyl methacrylamide, N-n-butyl methacrylamide, N-isobutyl methacrylamide, N,N-dimethyl acrylamide, N,N-dimethyl methacrylamide, N,N-diethyl acrylamide, and N,N-diethyl methacrylamide.

In some embodiments, the monomer containing an ester group is selected from one or more of methyl acrylate, ethyl acrylate, butyl acrylate, isoamyl acrylate, isooctyl acrylate, methyl methacrylate, ethyl methacrylate, hydroxyethyl acrylate and hydroxypropyl acrylate.

The above materials are simple and easy to obtain, which can greatly reduce the manufacturing cost of the binder.

In some embodiments, the molar content of the structural unit derived from a monomer containing a cyano group in the polymer A is 50%-70%, the molar content of the structural unit derived from a monomer containing an ester group is 10%-30%, and the molar content of the structural unit derived from a monomer containing an amide group is 10%-30%, based on the total molar content of structural units in the polymer A.

A reasonable combination of structural units derived from monomers containing various groups can take into account the strength, flexibility, adhesive performance and swelling resistance of the polymer A, such that the electrode plate has excellent adhesive force and processing performance.

In some embodiments, the positive electrode active substance is a lithium-containing transition metal oxide, optionally lithium ferrous phosphate, or the doped and modified materials thereof, or at least one of the conductive carbon-coated modified materials, conductive metal-coated modified materials or conductive polymer-coated modified materials thereof.

The positive electrode active substance of lithium ferrous phosphate has a microporous structure, and its surface has a high degree of graphitization after carbon coating. The above structural characteristics lead to its poor wettability in slurry solvents (such as N-methylpyrrolidone NMP), which in turn makes the slurry poor in stability, low in solid content, easy to lose viscosity after being placed, and cannot be used normally. The polymer A contains groups having good affinity with carbon materials with high degree of graphitization, such as N-containing groups (cyano group, amide group), and oxygen-containing groups (ester group, amide group), so as to effectively increase the wettability of lithium iron phosphate powder in solvents (such as NMP), thereby increasing the stability and processing performance of the positive electrode slurry.

In some embodiments, the mass content of the positive electrode active substance is 70%-99.5%, and optionally 88.0%-99.5%, based on the total mass of the positive electrode active substance, the conductive agent and the binder. The mass content of the positive electrode active substance within this range can ensure the loading of the positive electrode active substance and improve the power performance of the battery.

In some embodiments, the conductive agent is selected from one or more of superconducting carbon, acetylene black, carbon black, Ketjen black, carbon dots, carbon nanotubes, graphene, and carbon nanofibers.

In some embodiments, the mass content of the conductive agent is 0.2%-6.0%, based on the total mass of the positive electrode active substance, the conductive agent and the binder.

[Positive Electrode Plate]

In one embodiment of the present application, a positive electrode plate is provided, comprising a current collector, a primer coating layer provided on at least one surface of the current collector, and a positive electrode film provided on the primer coating layer, wherein the primer coating layer contains a polymer A soluble in an aqueous solvent, and the polymer A comprises a structural unit derived from a monomer containing a cyano group, a structural unit derived from a monomer containing an amide group, and a structure unit derived from a monomer containing an ester group.

Herein, the term "current collector" refers to any conductive substrate capable of conducting current to electrodes during discharge or charge of a secondary battery.

The term "positive electrode film" refers to the coating formed after the positive electrode slurry is coated and dried.

The positive electrode active substance with small particles has the advantages of large specific surface area and being able to fully react with the electrolyte solution. However, its large specific surface area also brings the disadvantage of poor adhesion with the current collector, and as a result, demolding is easy to occur during the coating of positive electrode slurry. If the amount of binder in the positive electrode slurry is increased, it will lead to brittleness of the electrode plate during cold pressing, and the compaction density will decrease. Therefore, it is necessary to add a special primer coating layer on the current collector to increase the adhesive force between the positive electrode film and the current collector.

Since the polymer A soluble in an aqueous solvent in the primer coating layer contains cyano group, amide group and ester group, it can be swollen properly when it comes into contact with an oily solvent (such as NMP) of the positive electrode slurry during the coating process of the positive electrode slurry, but it will not be soluble. The molecular contact formed between the polymer A in the primer coating layer and the binder in the positive electrode slurry can realize mutual diffusion, which can greatly increase the adhesive force between the positive electrode film and the current collector. Moreover, the ester group in the polymer A can form a strong hydrogen bond with the hydroxyl group in the oxide layer on the surface of the current collector, so as to ensure that the positive electrode film is firmly attached to the current collector.

The polymer A is soluble in an aqueous solvent means that the polymer A is soluble in an aqueous solvent to form a solution or a dispersion system, and the solubility of the polymer A in the aqueous solvent is not less than 1 g. Optionally, the solubility of the polymer A in the aqueous solvent is not less than 10 g.

In some embodiments, the polymer A soluble in an aqueous solvent in the primer coating layer is molded by means of bulk polymerization, suspension polymerization, emulsion polymerization or solution polymerization. In some embodiments, the polymer A soluble in an aqueous solvent in the primer coating layer is molded by means of emulsion polymerization, which is easy for mass production, simple and environmentally friendly.

In some embodiments, the polymer A is used in the primer coating layer of the positive electrode plate in the present application, which increases the molding quality, adhesive force and flexibility of the positive electrode plate, and optimizes the cycling performance of the battery.

In some embodiments, the weight average molecular weight of the polymer A in the primer coating layer is $1.5 \times 10^5 - 2 \times 10^5$.

An appropriate weight average molecular weight can increase the molding quality of the electrode plate, taking into account the manufacturability and adhesion of the primer coating layer, and at the same time ensure that the polymer A in the primer coating layer has a certain diffusibility when the positive electrode slurry is coated.

In some embodiments, the mass content of the polymer A in the primer coating layer is 5%-40%, optionally 5%-30%, and optionally 5%-20%, based on the total mass of the primer coating layer.

If the amount of the polymer A in the primer coating layer is too high, the stability of the primer coating layer and the cycling performance of the battery will be reduced. The mass of the polymer A in the primer coating layer within this range can improve the appearance quality and brittleness of the electrode plate, as well as the adhesive performance of the electrode plate and the cycling performance of the battery.

In some embodiments, the primer coating layer also comprises a conductive agent, and the conductive agent is selected from one or more of carbon black, acetylene black, carbon fiber, graphite, and carbon nanotubes.

The addition of a conductive agent to the primer coating layer can reduce the interface resistance between the positive electrode film and the current collector, increase the charge/discharge rate performance of the battery, and prolong the cycle life of the battery.

In some embodiments, the thickness of the primer coating layer is 1-20 μm.

If the thickness of the primer coating layer is too large, the conductivity of the current collector will be poor; if the thickness of the primer coating layer is too small, effective adhesion in the electrode plate cannot be guaranteed. The thickness of the primer coating layer within this range can take into account the adhesive performance of the electrode plate, and the power performance and cycling performance of the battery.

In some embodiments, the coating areal density of the positive electrode film is not less than 20 mg/cm$^2$.

Herein, the term "areal density" is calculated by dividing the mass by the corresponding area.

By providing the primer coating layer of the present application in the electrode plate, it can be ensured that a certain content of a positive electrode active substance is loaded on the positive electrode plate, thereby ensuring the power performance of the battery.

In some embodiments, the positive electrode film comprises a positive electrode active substance, a binder and a conductive agent, wherein the binder comprises a polymer A soluble in an oily solvent, and the polymer A comprises a structural unit derived from a monomer containing a cyano group, a structural unit derived from a monomer containing an amide group, and a structure unit derived from a monomer containing an ester group.

The polymer A is soluble in an oily solvent means that the polymer A is soluble in an oily solvent to form a solution or dispersion system, and the solubility of the polymer A in the oily solvent is not less than 1 g. Optionally, the solubility of the polymer A in the oily solvent is not less than 10 g.

The polymer A soluble in an oily solvent is used in the positive electrode film as a binder to diffusely connect with the polymer A in the primer coating layer, which can further enhance the adhesive force between the primer coating layer and the positive electrode film, improve the appearance quality and brittleness of the electrode plate, and increase the adhesive performance of the electrode plate and the cycling performance of the battery.

In any embodiment, the positive electrode film comprises a polymer A with a weight average molecular weight of $7 \times 10^5$-$1 \times 10^6$.

The control of the weight average molecular weight of the polymer A can further reduce the growth rate of the cyclic internal resistance of the battery while increasing the adhesive force of the positive electrode plate.

In any embodiment, the positive electrode film also comprises a polymer A with a weight average molecular weight of $1 \times 10^5$-$2.5 \times 10^5$.

The polymer A with a weight average molecular weight of $1 \times 10^5$-$2.5 \times 10^5$ acts as a dispersant in the positive electrode film, and its addition can further increase the dispersibility of the positive electrode active substance in the positive electrode film, such that the prepared electrode plate has higher adhesive force, and the battery has a lower growth rate of cyclic internal resistance.

Due to the large specific surface area and many small particles of some positive electrode active substances (such as lithium ferrous phosphate LFP), the slurry for forming the positive electrode film is easy to agglomerate in the preparation process, which leads to the blockage of the filter screen. By using a polymer A with lower weight average molecular weight in the slurry where the positive electrode film is molded, the agglomeration between positive electrode active substances (such as lithium ferrous phosphate LFP powder particles) can be avoided by means of their electrostatic repulsion or steric hindrance; at the same time, it can disperse and suspend other small molecular substances in the positive electrode film, so that the slurry does not settle after being placed for a short time and its stability is increased. In addition, the polymer A with a low weight average molecular weight has a low glass transition temperature, which can further increase the flexibility of the positive electrode film.

In some embodiments, the positive electrode active substance is a lithium-containing transition metal oxide, and the positive electrode active substance is optionally lithium ferrous phosphate or the doped and modified materials thereof, or at least one of the conductive carbon-coated modified materials, conductive metal-coated modified materials or conductive polymer-coated modified materials thereof.

Polyacrylic acid is often used as a binder in the primer coating layer of a traditional lithium ferrous phosphate system. However, the polarity of polyacrylic acid and polyvinylidene fluoride, a traditional binder in the positive electrode film, is quite different, and the adhesive force therebetween is low. The polyacrylic acid in the primer coating layer has poor solubility in the positive electrode slurry solvent, and cannot form an effective diffusion connection between the primer coating layer and the positive electrode film when the slurry is coated and dried.

By using the polymer A provided by the present application that can be wetted by N-methylpyrrolidone (NMP) for the second time as the binder in the primer coating layer, the mutual diffusion between the binder in the primer coating layer and the positive electrode film can be realized to increase the adhesive force, which further improves the appearance quality and brittleness of the electrode plate, and increases the adhesive performance of the electrode plate and the cycling performance of the battery.

In some embodiments, the mass content of the positive electrode active substance is 70%-99.5%, and optionally 88.0%-99.5%, based on the total mass of the positive electrode film. The mass content of the positive electrode active substance within this range can ensure the loading of the positive electrode active substance and improve the power performance of the battery.

In some embodiments, the mass content of the polymer A with a weight average molecular weight of $7 \times 10^5$-$1 \times 10^6$ in the positive electrode film is 0.4%-5.5%, and/or the mass content of the polymer A with a weight average molecular weight of $1 \times 10^5$-$2.5 \times 10^5$ in the positive electrode film is 0.05%-0.5%, based on the mass of the positive electrode film.

If the polymer A with a weight average molecular weight of $7 \times 10^5$-$1 \times 10^6$ is added too much, the power performance and cycling performance of the battery will be reduced. The polymer A with a weight average molecular weight of $7 \times 10^5$-$1 \times 10^6$ within this mass content range can increase the stability and processability of the slurry and the adhesion of the electrode plate, and greatly reduce the growth rate of the cyclic internal resistance of the battery at the same time. If the polymer A with a weight average molecular weight of $1 \times 10^5$-$2.5 \times 10^5$ is added too much, it will increase the swelling of the electrode plate and affect the power performance of the battery at room temperature. The polymer A with a weight average molecular weight of $1 \times 10^5$-$2.5 \times 10^5$ within this mass content range can further increase the stability and processability of the slurry and the adhesive force of the electrode plate, and greatly reduce the growth rate of the cyclic internal resistance of the battery at the same time.

In some embodiments, the monomer containing a cyano group in the polymer A is selected from one or more of acrylonitrile and crotonitrile;

the monomer containing an amide group is selected from one or more of methacrylamide, N-methyl methacrylamide, N-ethyl methacrylamide, N-n-propyl methacrylamide, N-isopropyl methacrylamide, N-n-butyl methacrylamide, N-isobutyl methacrylamide, N,N-dimethyl acrylamide, N,N-dimethyl methacrylamide, N,N-diethyl acrylamide and N,N-diethyl methacrylamide; and the monomer containing an ester group is selected from one or more of methyl acrylate, ethyl acrylate, butyl acrylate, isoamyl acrylate, isooctyl acrylate, methyl methacrylate, ethyl methacrylate, hydroxyethyl acrylate and hydroxypropyl acrylate.

The above materials are simple and easy to obtain, which can greatly reduce the manufacturing cost of the binder.

In some embodiments, the molar content of the structural unit derived from a monomer containing a cyano group in the polymer A is 50%-60%, the molar content of the structural unit derived from a monomer containing an ester group is 10%-20%, and the molar content of the structural unit derived from a monomer containing an amide group is 20%-30%, based on the total molar content of structural units in the polymer A, respectively.

A reasonable combination of structural units derived from monomers containing various groups can take into account the strength, flexibility, adhesion and swelling resistance of the polymer A.

As an example, the positive electrode current collector has two surfaces opposite in its own thickness direction, and the positive electrode film layer is provided on either or both of opposite surfaces of the positive electrode current collector.

In some embodiments, the positive electrode current collector may be a metal foil or a composite current collector. For example, as a metal foil, an aluminum foil can be used. The composite current collector may comprise a polymer material base layer and a metal layer formed on at least one surface of the polymer material base layer. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may comprise at least one of the following materials: lithium-containing phosphates of an olivine structure, lithium transition metal oxides, and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium ferrous phosphate (e.g. $LiFePO_4$ (also referred to as LFP)), lithium ferrous phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer further optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: dispersing the above-mentioned components for preparing the positive electrode plate, such as a positive electrode active material, a conductive agent, a binder and any other components, in a solvent (e.g., N-methyl pyrrolidone) to form a positive electrode slurry; and coating the positive electrode current collector with the positive electrode slurry, followed by the procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector may be a metal foil or a composite current collector. For example, as a metal foil, a copper foil can be used. The composite current collector may comprise a polymer material base layer and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may comprise at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites, and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or as a combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: dispersing the above-mentioned components for preparing the negative electrode plate, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode plate.

[Electrolyte]

The electrolyte functions to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some embodiments, an electrolyte solution is used as the electrolyte. The electrolyte solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally include an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Separator]

In some embodiments, the secondary battery further comprises a separator. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be either a single-layer film or a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a stacking process.

In some embodiments, the secondary battery may comprise an outer package. The outer package may be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may comprise polypropylene, polybutylene terephthalate, polybutylene succinate, etc.

[Secondary Battery]

In one embodiment of the present application, a secondary battery is provided, which comprises an electrode assembly and an electrolyte solution. The electrode assembly comprises a positive electrode plate, a separator and a negative electrode plate. The positive electrode plate is prepared from a positive electrode slurry of any embodiment.

In some embodiments, an electrode assembly may be formed by a positive electrode plate, a negative electrode plate and a separator by a winding process or a stacking process.

In some embodiments, the secondary battery may comprise an outer package. The outer package may be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may comprise polypropylene, polybutylene terephthalate, polybutylene succinate, etc.

The shape of the secondary battery is not particularly limited in the present application and may be cylindrical, square or of any other shape. For example, FIG. 1 shows a secondary battery 5 with a square structure as an example.

In some embodiments, referring to FIG. 2, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 may cover the opening to close the accommodating cavity. The positive electrode plate, the negative electrode plate, and the separator may be subjected to a winding process or a laminating process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more, and can be selected by those skilled in the art according to actual requirements.

[Battery Module]

In some embodiments, the secondary battery can be assembled into a battery module, and the number of the secondary batteries contained in the battery module may be one or more, and the specific number can be selected by those skilled in the art according to the application and capacity of the battery module.

Figure 3:
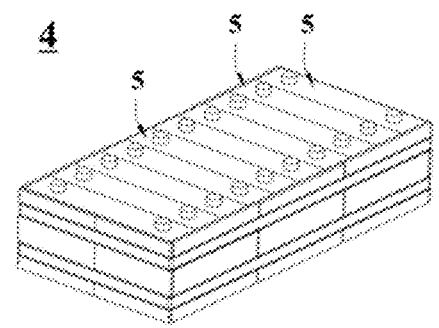
FIG. 3 is a schematic diagram of a battery module according to an embodiment of the present application.
Figure 5:
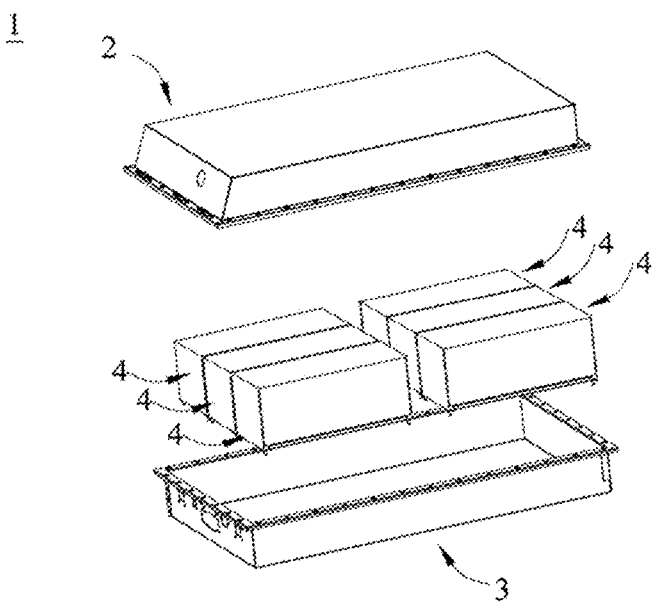
FIG. 5 is an exploded view of the battery pack according to the embodiment of the present application as shown in FIG. 4.

FIG. 5 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may further comprise an outer shell with an accommodating space, and the plurality of secondary batteries 5 are accommodated in the accommodating space.

[Battery Pack]

In some embodiments, the above battery module may also be assembled into a battery pack, the number of the battery modules contained in the battery pack may be one or more, and the specific number can be selected by those skilled in the art according to the application and capacity of the battery pack.

Figure 4:
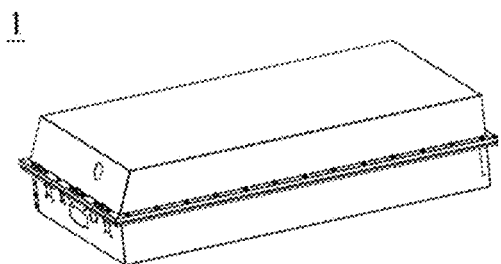
FIG. 4 is a schematic diagram of a battery pack according to an embodiment of the present application.

FIG. 4 and FIG. 5 show a battery pack 1 as an example. With reference to FIGS. 4 and 5, the battery pack 1 may include a battery case and a plurality of battery modules 4 provided in the battery case. The battery case comprises an upper case body 2 and a lower case body 3, wherein the upper case body 2 may cover the lower case body 3 to form a closed space for accommodating the battery modules 4. A plurality of battery modules 4 may be arranged in the battery case in any manner.

[Power Consuming Device]

In one embodiment of the present application, a power consuming device is provided, which comprises at least one of a secondary battery of any embodiment, a battery module of any embodiment or a battery pack of any embodiment.

The power consuming device comprises at least one of the secondary battery, battery module or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship, and satellite, an energy storage system, etc., but is not limited thereto.

As for the power consuming device, the secondary battery, battery module or battery pack can be selected according to the usage requirements thereof.

Figure 6:
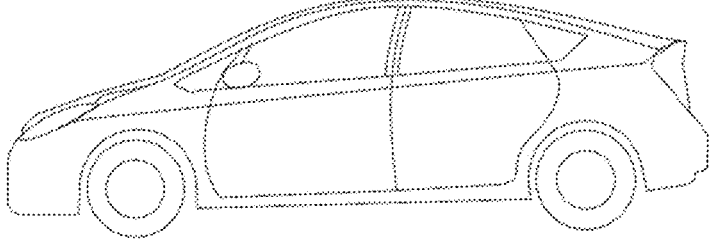
FIG. 6 is a schematic diagram of a power consuming device using a secondary battery according to an embodiment of the present application as a power source.

FIG. 6 shows a power consuming device as an example. The power consuming device may be a pure electric vehicle, a hybrid electric vehicle, a plug-in hybrid electric vehicle, etc. In order to meet the requirements of the power consuming device for a high power and a high energy density of a secondary battery, a battery pack or a battery module may be used.

As another example, the device may be a mobile phone, a tablet computer, a laptop computer, etc. The device is generally required to be thin and light, and may have a secondary battery used as a power source.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Example 1

1) Preparation of Polymer a with Weight Average Molecular Weight of 600,000-1,000,000 in Positive Electrode Film (Polymer A-1)

0.20 g of a suspending agent is dissolved in 150 ml of deionized water, and dried nitrogen is blown for 30 min, followed by the addition of 400 mg of calcium sulfate and 80 mg of calcium phosphate. Then 420 mmol of acrylonitrile, 140 mmol of methyl acrylate, 210 mmol of acrylamide, and 3.003 mmol of AIBN (0.39% based on the total monomer molar content) are added. Finally, 0.1 g of a magnesium sulfate aqueous solution dissolved in 50 ml of deionized water is added, the suspension is heated to 70° C. and reacted for 5 hours. At the end of the reaction, the suspension is cooled, and the product is filtered, washed, and then vacuum-dried at 70° ° C. to constant weight, so as to obtain a white powder. This binder is used for electrode plates. The molar ratio of the structural unit derived from acrylonitrile, the structural unit derived from acrylamide, and the structural unit derived from methyl acrylate in the polymer A-1 is 6:3:2. The weight average molecular weight of the prepared polymer A-1 is 800,000.

2) Preparation of Positive Electrode Plate

The lithium ferrous phosphate LFP active material of example 1, a conductive agent of carbon black and the polymer A-1 are dissolved in a N-methylpyrrolidone (NMP) solution at a weight ratio of 93:4:3, and stirred and mixed evenly to obtain a positive electrode slurry with a solid content of 55%; the positive electrode slurry is then coated onto a positive electrode current collector, followed by drying, cold pressing and slitting to obtain a positive electrode plate.

3) Preparation of Negative Electrode Plate

An active substance of synthetic graphite, a conductive agent of carbon black, a binder of styrene butadiene rubber (SBR) and a thickening agent of sodium hydroxymethyl cellulose (CMC) are dissolved at a weight ratio of 96.2:0.8:0.8:1.2 into a solvent of deionized water, and uniformly mixed to prepare a negative electrode slurry; the negative electrode slurry is uniformly coated onto a negative electrode current collector of copper foil one or more times, followed by drying, cold pressing, and slitting to obtain the negative electrode plate.

4) Separator

A polypropylene film is used as a separator.

5) Preparation of Electrolyte Solution

In an argon atmosphere glove box ($H_2O<0.1$ ppm and $O_2<0.1$ ppm), the organic solvents of ethylene carbonate (EC)/ethyl methyl carbonate (EMC) are uniformly mixed at a volume ratio of 3/7, and a $LiPF_6$ lithium salt is added and dissolved in the organic solvents and uniformly stirred to prepare a 1 M $LiPF_6$ EC/EMC solution, so as to obtain the electrolyte solution.

6) Preparation of Battery

The positive electrode plate, the separator and the negative electrode plate in example 1 are stacked in sequence and then wound to obtain a bare cell, wherein the separator is positioned between the positive electrode plate and the negative electrode plate and functions for isolation; the bare cell is welded with tabs and put into an aluminum housing and baked at 80° ° C. for water removal, and the electrolyte solution is subsequently injected therein, followed by sealing to obtain an uncharged battery. The uncharged battery is then successively subjected to procedures such as leaving to stand, hot and cold pressing, formation, shaping, and capacity tests to obtain a lithium ion battery product of example 1.

In examples 2-9, the ratios of the positive electrode active substance and the polymer A-1 added are adjusted, and other parameters and steps are the same as in example 1. The specific parameters are shown in Table 1.

Example 10

Preparation of Polymer a with Weight Average Molecular Weight of 50,000-400,000 in Positive Electrode Film (Polymer A-2):

0.20 g of a suspending agent is dissolved in 150 ml of deionized water, and dried nitrogen is blown for 30 min, followed by the addition of 300 mg of calcium sulfate and 60 mg of calcium phosphate. Then 350 mmol of acrylonitrile, 140 mmol of methyl acrylate, 210 mmol of acrylamide, and 2.25 mmol of AIBN (0.3% based on the total monomer molar content) are added. Finally, 0.06 g of a magnesium sulfate aqueous solution dissolved in 50 ml of deionized water is added, the suspension is heated to 46° ° C. and reacted for 2.5 hours. At the end of the reaction, the suspension is cooled, and the product is filtered, washed, and then vacuum-dried at 70° C. to constant weight, so as to obtain a white powder. This binder is used in the electrode plate slurry for dispersion. The molar ratio of the structural unit derived from acrylonitrile, the structural unit derived from acrylamide, and the structural unit derived from methyl acrylate in the polymer A-2 is 5:3:2. The weight average molecular weight of the polymer A-2 is 170,000.

Preparation of Positive Electrode Plate:

The lithium ferrous phosphate LFP active material, a conductive agent of carbon black, the polymer A-1 and the polymer A-2 are dissolved in a N-methylpyrrolidone (NMP) solution at a weight ratio of 92:4:3.95:0.05, and stirred and mixed evenly to obtain a positive electrode slurry with a solid content of 55%; the positive electrode slurry is then coated onto a positive electrode current collector, followed by drying, cold pressing and slitting to obtain a positive electrode plate.

Other steps and parameters are the same as in example 1, and the specific parameters are shown in Table 1.

In examples 11-16, the total amount of the polymer A added is kept constant, the ratios of the polymer A-1 and the polymer A-2 added are adjusted, and other parameters and steps are the same as in example 1. The specific parameters are shown in Table 1.

In examples 17-20, the weight average molecular weights of polymers A-1 are adjusted, and the preparation methods of polymers A-1 with different weight average molecular weights are as follows:

The preparation method of the polymer A-1 in example 17 is as follows: 0.20 g of a suspending agent is dissolved in 150 ml of deionized water, and dried nitrogen is blown for 30 min, followed by the addition of 400 mg of calcium sulfate and 80 mg of calcium phosphate. Then 420 mmol of acrylonitrile, 140 mmol of methyl acrylate, 210 mmol of acrylamide, and 3.003 mmol of AIBN (0.39% based on the total monomer molar content) are added. Finally, 0.10 g of a magnesium sulfate aqueous solution dissolved in 50 ml of deionized water is added, the suspension is heated to 65° ° C. and reacted for 5 hours. At the end of the reaction, the suspension is cooled, and the product is filtered, washed, and then vacuum-dried at 70° ° C. to constant weight, so as to obtain a white powder. This binder is used for electrode plates. The molar ratio of the structural unit derived from acrylonitrile, the structural unit derived from acrylamide, and the structural unit derived from methyl acrylate in the polymer A-1 is 6:3:2. The weight average molecular weight of the prepared polymer A-1 is 700,000.

The preparation method of the polymer A-1 in example 18 is as follows: 0.20 g of a suspending agent is dissolved in 150 ml of deionized water, and dried nitrogen is blown for 30 min, followed by the addition of 400 mg of calcium sulfate and 80 mg of calcium phosphate. Then 420 mmol of acrylonitrile, 140 mmol of methyl acrylate, 210 mmol of acrylamide, and 3.003 mmol of AIBN (0.39% based on the total monomer molar content) are added. Finally, 0.13 g of a magnesium sulfate aqueous solution dissolved in 50 ml of deionized water is added, the suspension is heated to 75° C. and reacted for 6 hours. At the end of the reaction, the suspension is cooled, and the product is filtered, washed, and then vacuum-dried at 70° C. to constant weight, so as to obtain a white powder. This binder is used for electrode plates. The molar ratio of the structural unit derived from acrylonitrile, the structural unit derived from acrylamide, and the structural unit derived from methyl acrylate in the polymer A-1 is 6:3:2. The weight average molecular weight of the prepared polymer A-1 is 1,000,000.

The preparation method of the polymer A-1 in example 19 is as follows: 0.20 g of a suspending agent is dissolved in 150 ml of deionized water, and dried nitrogen is blown for 30 min, followed by the addition of 400 mg of calcium sulfate and 80 mg of calcium phosphate. Then 420 mmol of acrylonitrile, 140 mmol of methyl acrylate, 210 mmol of acrylamide, and 3.003 mmol of AIBN (0.39% based on the total monomer molar content) are added. Finally, 0.1 g of a magnesium sulfate aqueous solution dissolved in 50 ml of deionized water is added, the suspension is heated to 65° C. and reacted for 4 hours. At the end of the reaction, the suspension is cooled, and the product is filtered, washed, and then vacuum-dried at 70° C. to constant weight, so as to obtain a white powder. This binder is used for electrode plates. The molar ratio of the structural unit derived from acrylonitrile, the structural unit derived from acrylamide, and the structural unit derived from methyl acrylate in the polymer A-1 is 6:3:2. The weight average molecular weight of the prepared polymer A-1 is 600,000.

The preparation method of the polymer A-1 in example 20 is as follows: 0.20 g of a suspending agent is dissolved in 150 ml of deionized water, and dried nitrogen is blown for 30 min, followed by the addition of 400 mg of calcium sulfate and 80 mg of calcium phosphate. Then 420 mmol of acrylonitrile, 140 mmol of methyl acrylate, 210 mmol of acrylamide, and 3.003 mmol of AIBN (0.39% based on the total monomer molar content) are added. Finally, 0.18 g of a magnesium sulfate aqueous solution dissolved in 50 ml of deionized water is added, the suspension is heated to 80° C. and reacted for 7 hours. At the end of the reaction, the suspension is cooled, and the product is filtered, washed, and then vacuum-dried at 70° ° C. to constant weight, so as to obtain a white powder. This binder is used for electrode plates. The molar ratio of the structural unit derived from acrylonitrile, the structural unit derived from acrylamide, and the structural unit derived from methyl acrylate in the polymer A-1 is 6:3:2. The weight average molecular weight of the prepared polymer A-1 is 1,100,000.

In examples 21-24, the weight average molecular weight of the polymer A-2 is adjusted, and other parameters and steps are the same as in example 1. The specific parameters are shown in Table 1.

The preparation method of the polymer A-2 in example 21 is as follows: 0.20 g of a suspending agent is dissolved in 150 ml of deionized water, and dried nitrogen is blown for 30 min, followed by the addition of 300 mg of calcium sulfate and 60 mg of calcium phosphate. Then 350 mmol of acrylonitrile, 140 mmol of methyl acrylate, 210 mmol of acrylamide, and 2.25 mmol of AIBN (0.3% based on the total monomer molar content) are added. Finally, 0.05 g of a magnesium sulfate aqueous solution dissolved in 50 ml of deionized water is added, the suspension is heated to 46° C. and reacted for 2.0 hours. At the end of the reaction, the suspension is cooled, and the product is filtered, washed, and then vacuum-dried at 70° ° C. to constant weight, so as to obtain a white powder. This binder is used in the electrode plate slurry for dispersion. The molar ratio of the structural unit derived from acrylonitrile, the structural unit derived from acrylamide, and the structural unit derived from methyl acrylate in the polymer A-2 is 5:3:2. The weight average molecular weight of the prepared polymer A-2 is 100,000.

The preparation method of the polymer A-2 in example 22 is as follows: 0.20 g of a suspending agent is dissolved in 150 ml of deionized water, and dried nitrogen is blown for 30 min, followed by the addition of 300 mg of calcium sulfate and 60 mg of calcium phosphate. Then 350 mmol of acrylonitrile, 140 mmol of methyl acrylate, 210 mmol of acrylamide, and 2.25 mmol of AIBN (0.3% based on the total monomer molar content) are added. Finally, 0.08 g of a magnesium sulfate aqueous solution dissolved in 50 ml of deionized water is added, the suspension is heated to 50° C. and reacted for 3.5 hours. At the end of the reaction, the suspension is cooled, and the product is filtered, washed, and then vacuum-dried at 70° C. to constant weight, so as to obtain a white powder. This binder is used in the electrode plate slurry for dispersion. The molar ratio of the structural unit derived from acrylonitrile, the structural unit derived from acrylamide, and the structural unit derived from methyl acrylate in the polymer A-2 is 5:3:2. The weight average molecular weight of the prepared polymer A-2 is 250,000.

The preparation method of the polymer A-2 in example 23 is as follows: 0.20 g of a suspending agent is dissolved in 150 ml of deionized water, and dried nitrogen is blown for 30 min, followed by the addition of 300 mg of calcium sulfate and 60 mg of calcium phosphate. Then 350 mmol of acrylonitrile, 140 mmol of methyl acrylate, 210 mmol of acrylamide, and 2.25 mmol of AIBN (0.3% based on the total monomer molar content) are added. Finally, 0.03 g of a magnesium sulfate aqueous solution dissolved in 50 ml of deionized water is added, the suspension is heated to 40° C. and reacted for 1.5 hours. At the end of the reaction, the suspension is cooled, and the product is filtered, washed, and then vacuum-dried at 70° ° C. to constant weight, so as to obtain a white powder. This binder is used in the electrode plate slurry for dispersion. The molar ratio of the structural unit derived from acrylonitrile, the structural unit derived from acrylamide, and the structural unit derived from methyl acrylate in the polymer A-2 is 5:3:2. The weight average molecular weight of the prepared polymer A-2 is 50,000.

The preparation method of the polymer A-2 in example 24 is as follows: 0.20 g of a suspending agent is dissolved in 150 ml of deionized water, and dried nitrogen is blown for 30 min, followed by the addition of 300 mg of calcium sulfate and 60 mg of calcium phosphate. Then 350 mmol of acrylonitrile, 140 mmol of methyl acrylate, 210 mmol of acrylamide, and 2.25 mmol of AIBN (0.3% based on the total monomer molar content) are added. Finally, 0.10 g of a magnesium sulfate aqueous solution dissolved in 50 ml of deionized water is added, the suspension is heated to 58° C. and reacted for 4 hours. At the end of the reaction, the suspension is cooled, and the product is filtered, washed, and then vacuum-dried at 70° ° C. to constant weight, so as to obtain a white powder. This binder is used in the electrode plate slurry for dispersion. The molar ratio of the structural unit derived from acrylonitrile, the structural unit derived from acrylamide, and the structural unit derived from methyl acrylate in the polymer A-2 is 5:3:2. The weight average molecular weight of the prepared polymer A-2 is 400,000.

Comparative Example 1

A positive electrode active substance, an active material of LFP lithium ferrous phosphate, a conductive agent of carbon black, a binder of polyvinylidene fluoride (PVDF) are directly dissolved into a solvent of N-methylpyrrolidone (NMP) at a weight ratio of 92:4:4, and fully stirred and evenly mixed to obtain a positive electrode slurry; the positive electrode slurry is then uniformly coated onto a positive electrode current collector, followed by drying, cold pressing and slitting to obtain the positive electrode plate of comparative example 1. Other preparation steps are the same as in example 1.

Relevant parameters of the positive electrode preparations of the above examples 1-24 and comparative example 1 are shown in Table 1 below.

Example 25

Preparation of Polymer a Soluble in Aqueous Solvent in Primer Coating Layer (Polymer A-3):

1.84 mmol of sodium dodecylbenzene sulfonate is weighted and added together with 400 ml of deionized water into a stirring container, then 0.63 mol of acrylonitrile, 0.21 mol of methyl methacrylate, and 0.21 mol of acrylamide are added, stirred and heated to 74±1° C., wherein the stirring speed is controlled at 500 rpm; 1.2 parts of ammonium sulfate is added and reacted under stirring at 75° C. for 6 h, then the temperature is raised to 80° C., and the reaction is continued for 3 h to obtain an emulsion with a solid content of about 20%. This emulsion is used for primer coating. The molar ratio of the structural unit derived from acrylonitrile, the structural unit derived from acrylamide, and the structural unit derived from methyl acrylate in the polymer A-3 is 3:1:1. The weight average molecular weight of the polymer A-3 is 180,000.

Preparation of primer coating layer: the prepared emulsion containing the polymer A-3 and the conductive agent are used at a mass ratio of 30:70 by a kneading method, the conductive agent is completely infiltrated with deionized water, and finally deionized water is added to make the solid content of the slurry reach 15%, and the slurry is fully stirred evenly, and the delivery viscosity of the slurry is 200-800 mpa·s. When gravure coating is used, a gravure roller is engraved with pits, and the slurry is injected into the pits (30 μm) during coating. After the roller surface leaves the liquid surface, the slurry at the smooth place is scraped off by a scraper, and the slurry in the pits is transferred to the surface of the substrate under the action of a press roller, and the thickness of the single-sided coating after drying is about 5 μm. An aluminum foil with a primer coating is prepared for later use.

The preparation of the positive electrode plate is the same as in example 12, lithium ferrous phosphate:conductive agent SP:polymer A-1:polymer A-2 are dissolved in a N-methylpyrrolidone (NMP) solution at a mass ratio of 92:4:3.8:0.2, and stirred and mixed evenly to obtain a positive electrode slurry; and the positive electrode slurry is then uniformly coated onto the prepared aluminum foil with a primer coating, followed by drying, cold pressing, and slitting to obtain the positive electrode plate. The coating prepared by the positive electrode slurry is called the positive electrode film, wherein the areal density of the single-side coating of the positive electrode film is about 20 mg/cm², and the compaction density of the single-side coating of the positive electrode film is about 2.3 g/cm³. Other steps of example 25 are the same as in example 12.

In examples 26-29, the mass ratio of the emulsion containing the polymer A-3 to the conductive agent is adjusted to be 40:60, 50:50, 60:40, and 70:30, respectively. Other steps are the same as in example 12.

In example 30, the preparation of the positive electrode plate comprises: nickel cobalt manganese oxide (NCM): lithium ferrous phosphate:conductive agent SP:polymer A-1:polymer A-2 are dissolved in a N-methylpyrrolidone (NMP) solution at a mass ratio of 82:10:4:3.8:0.2, and stirred and mixed evenly to obtain a positive electrode slurry; the positive electrode slurry is then uniformly coated onto the prepared aluminum foil with a primer coating, followed by drying, cold pressing, and slitting to obtain the positive electrode plate. Other steps are the same as in example 12.

In comparative example 2, no primer coating layer is provided, and the positive electrode plate is the same as in example 25;

the primer coating layer in comparative example 3 is a polyacrylic acid (PAA) primer coating layer, and the positive electrode plate is the same as in comparative example 2. A method for preparing the PAA primer coating layer is as follows: the prepared aqueous emulsion containing PAA has a solid content of about 20%, and the emulsion and the conductive agent are used at a mass ratio of 50:50 by a kneading method, the conductive agent is completely infiltrated with deionized water, and finally deionized water is added to make the solid content of the slurry reach 15%, and the slurry is fully stirred evenly, and the delivery viscosity of the slurry is 200-800 mpa·s. When gravure coating is used, a gravure roller is engraved with pits, and the slurry is injected into the pits (30 μm) during coating. After the roller surface leaves the liquid surface, the slurry at the smooth place is scraped off by a scraper, and the slurry in the pits is transferred to the surface of the substrate under the action of a press roller, and the thickness of the single-sided coating after drying is about 5 μm. An aluminum foil with a primer coating is prepared for later use.

Relevant parameters of the preparations of the above examples 25-30 and comparative examples 2-3 are shown in Table 2 below.

In addition, the polymers, electrode plates and batteries obtained in the above examples 1-24 and comparative example 1 are tested for performance, and the test results are shown in Table 1; and the polymers, electrode plates and batteries obtained in the above examples 25-30 and comparative examples 2-3 are tested for performance, and the test results are shown in Table 2. The test method is as follows:

1. Structural Unit Type Test of Polymer—Infrared Spectroscopy Test

A sample is subjected to KBr tabletting using a tablet transmission method, and the KBr background blank is deducted by the transmission method to obtain the sample test spectrum. Instrument model: Nicolet 5700 (Thermo Nicolet, USA), standard linearity: better than 0.07%, resolution: 0.09 cm$^{-1}$, wavenumber range: 400-4000 cm$^{-1}$, sensitivity <9.65*10$^{-5}$ Abls. It is used to detect the structure and chemical bonds of molecules.

2. Test of Weight Average Molecular Weight

A Waters 2695 Isocratic HPLC gel chromatograph (differential refractive index detector 2141) is used. A polystyrene solution sample with a mass fraction of 3.0% is used as a reference, and a matched chromatographic column (oily: Styragel HT5 DMF7.8*300 mm+Styragel HT4) is selected. A purified N-methylpyrrolidone (NMP) solvent is used to prepare 3.0% of a binder glue solution, and the prepared solution is allowed to stand for one day for later use. During the test, tetrahydrofuran is sucked with a syringe first for rinse, and this process is repeated several times. Then 5 ml of the test solution is sucked, the air in the syringe is removed, and the needle tip is wiped to dry. Finally, the sample solution is slowly injected into the injection port.

After the test is completed, the outflow curve, the molecular weight distribution curve and the molecular weight statistical results are output.

3. Viscosity Test of Slurry

A suitable rotor is selected, a viscometer is fixed, and the positive electrode slurry is placed under the viscometer, such that the slurry just submerges the scale line of the rotor. Instrument model: SHANGHAI FANGRUI NDJ-5S, rotor: 63 #(2000-10000 mPa·s) and 64 #(10000-50000 mPa·s), rotation speed: 12 r/min, test temperature: 25° C., the test time is 5 min, the data is read after the display is stable.

4. Test of Slurry Filterability

A 500 ml of beaker is taken and placed at the lower end of a 200-mesh filter holder, 500 ml of the slurry is taken and placed in a filter screen for filtration. The time when the volume of the slurry in the beaker reaches 300 ml is recorded, and this time is used to judge the filtration performance of the slurry. If the filtration time is lower than 120 s, it indicates that the filtration performance of the slurry is OK; if the slurry cannot pass through the filter screen, it indicates that the filter performance of the slurry is poor, and it is judged as "NG".

5. Test of Slurry Fluidity:

An appropriate amount of the positive electrode slurry is taken with a medicine spoon to observe whether the natural downward flow of the positive electrode slurry is smooth. If the natural downward flow is smooth, it is judged to be OK; if the fluidity is not good, the slurry appears jelly-like and becomes agglomerated, indicating that gel appears, and it is judged as NG.

6. Appearance Test of Electrode Plate:

after the positive electrode plate is prepared, the surface state of the positive electrode plate is observed, including whether it is flat, whether there are cracks, and whether there is particle agglomeration, etc. If none of the above phenomena exists, it is recorded as OK. If one of them exists, it is recorded.

Figure 7:
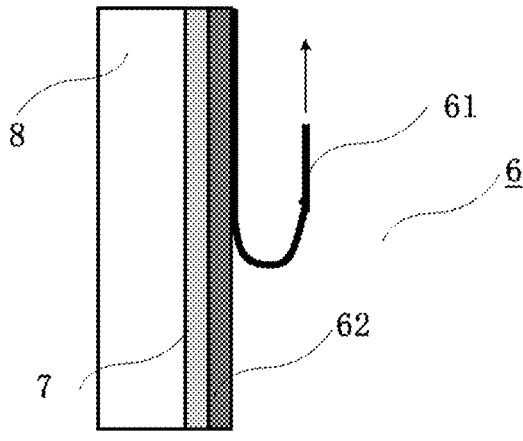
FIG. 7 is a schematic diagram of a test on the adhesive force of the electrode plate.

7. Test of Adhesive Force:

the positive electrode plate in the example is cut into a test sample with a size of 20*100 mm for later use. The test method is shown in FIG. 7. The double-sided tape 7 is pasted on one side of the electrode plate 6, and compacted with a pressure roller to make it completely fit with the electrode plate; and the other side of the double-sided tape 7 is pasted on the surface of the steel plate 8, and one end of the current collector 61 is reversely bent with a bending angle of 180°, as shown by the arrow in FIG. 7. A high-speed rail tensile machine is used to test, one end of the steel plate 8 is fixed to a lower clamp of a tensile machine, and the bent end of the current collector 61 is fixed to an upper clamp. The angle of the current collector is adjusted to ensure that the upper and lower ends are in a vertical position, and then the sample is stretched at a speed of 50 mm/min until the current collector 61 is completely peeled off from the coating 62 on the surface of the current collector 61. The displacement and acting force are recorded during the process, and when the force is balanced, it is considered as the adhesive force of the electrode plate 6.

8. Brittleness Test of Electrode Plate

The positive electrode plate in the example is cut into a test sample with a size of 20*100 mm for later use. The electrode plate is bent and folded in half and fixed well, and rolled with a 2 kg of rolling roller once to check the electrode plate for light transmission and metal leakage place; if there is no light transmission and metal leakage, then the electrode plate is folded in half reversely and fixed well, and rolled with a 2 kg of rolling roller once to check the electrode plate for light transmission and metal leakage in folded place; and the above steps are repeated until light transmission and metal leakage appear in folded place of the electrode plate.

9. DC Impedance Test of Battery

The process of the DC impedance test of the battery is as follows: At 25° C., a battery in an example or comparative example is charged at a constant current of ⅓ C to 3.65 V, and then charged at a constant voltage of 3.65 V to a current of 0.05 C; after standing for 5 min, the voltage is recorded as $V_1$. Then the battery is discharged at ⅓ C for 30 s and the voltage is recorded as $V_2$, and the internal resistance $DCR_1$ of the battery after the first cycle is calculated by the formula $3*(V_2-V_1)/C$. The above steps are repeated for the same battery above, and the internal resistance DCRn (n= 1, 2, 3 . . . , and 100) of the battery after the nth cycle is recorded at the same time. With the values of the 100 points of the above $DCR_1$, $DCR_2$, $DCR_3$, . . . , and $DCR_{100}$ as the ordinate and the corresponding number of cycles as the abscissa, a curve of the battery discharge DCR corresponding to the positive electrode active substance and the number of cycles is obtained.

During this test, the first cycle corresponds to n=1, the second cycle corresponds to n=2, . . . and the 100th cycle corresponds to n=100. DCR increase rate in Table $1=(DCR_{500}-DCR_1)/DCR_1*100\%$, the test processes of comparative example 1 and other examples are the same as above.

10. Number of Cycles Test of Battery

Number of cycles of the battery are derived from capacity test. The testing process is as follows: at 25° C., the battery corresponding to example 1 is charged at a constant current of ⅓ C to 3.65 V, then charged at a constant voltage of 3.65 V to a current of 0.05 C; after standing for 5 min, the battery is discharged at ⅓ C to 2.5 V, and the resulting capacity is recorded as the initial capacity $C_0$. The cut-off condition is $P_n \leq 70\% C_0$. The above steps are repeated for the same battery above, and the discharge capacity $C_n$ of the battery after the nth cycle is recorded at the same time, then the capacity retention rate of the battery $P_n=C_n/C_0*100\%$ after each cycle. With the values of the n points of $P_1$, $P_2$, . . . , and $P_n$ as the ordinate and the corresponding number of cycles as the abscissa, a curve of corresponding capacity retention rate of the battery and number of cycles are obtained. When $P_n \leq 70\% C_0$, stop the test and record the number of cycles.

TABLE 1

Parameters and performance test results of examples 1-24 and comparative example 1 ratio

| No. | Composition of polymer A | Molar ratio of acrylonitrile:acryl-amide:methyl-acrylate in polymer A-1 | Molecular weight of polymer A-1 (10,000) | Molar ratio of acrylonitrile:acryl-amide:methyl-acrylate in polymer A-2 | Molecular weight of polymer A-2 (10,000) | Molar ratio of positive electrode active substance LFP:conductive agent SP:polymer A-1:polymer A-2 | Mass content of polymer A-1 (%) |
|---|---|---|---|---|---|---|---|
| Example 1 | Acrylonitrile-acrylamide-methyl acrylate copolymer | 6:3:2 | 80 | 5:3:2 | 17 | 95.8:4:0.2:0 | 0.20 |
| Example 2 | Acrylonitrile-acrylamide-methyl acrylate copolymer | 6:3:2 | 80 | 5:3:2 | 17 | 95.6:4:0.4:0 | 0.4 |
| Example 3 | Acrylonitrile-acrylamide-methyl acrylate copolymer | 6:3:2 | 80 | 5:3:2 | 17 | 93:4:3:0 | 3 |
| Example 4 | Acrylonitrile-acrylamide-methyl acrylate copolymer | 6:3:2 | 80 | 5:3:2 | 17 | 92.5:4:3.5:0 | 3.50 |
| Example 5 | Acrylonitrile-acrylamide-methyl acrylate copolymer | 6:3:2 | 80 | 5:3:2 | 17 | 92.0:4:4:0 | 4 |
| Example 6 | Acrylonitrile-acrylamide-methyl acrylate copolymer | 6:3:2 | 80 | 5:3:2 | 17 | 91.5:4:4.5:0 | 4.50 |
| Example 7 | Acrylonitrile-acrylamide-methyl acrylate copolymer | 6:3:2 | 80 | 5:3:2 | 17 | 91.0:4:5.0:0 | 5.00 |

TABLE 1-continued

| | | Parameters and performance test results of examples 1-24 and comparative example 1 ratio | | | | | |
|---|---|---|---|---|---|---|---|
| Example 8 | Acrylonitrile-acrylamide-methyl acrylate copolymer | 6:3:2 | 80 | 5:3:2 | 17 | 90.5:4:5.5:0 | 5.50 |
| Example 9 | Acrylonitrile-acrylamide-methyl acrylate copolymer | 6:3:2 | 80 | 5:3:2 | 17 | 90:4:6:0 | 6 |
| Example 10 | Acrylonitrile-acrylamide-methyl acrylate copolymer | 6:3:2 | 80 | 5:3:2 | 17 | 92:4:3.95:0.05 | 3.95 |
| Example 11 | Acrylonitrile-acrylamide-methyl acrylate copolymer | 6:3:2 | 80 | 5:3:2 | 17 | 92:4:3.9:0.1 | 3.90 |
| Example 12 | Acrylonitrile-acrylamide-methyl acrylate copolymer | 6:3:2 | 80 | 5:3:2 | 17 | 92:4:3.8:0.2 | 3.80 |
| Example 13 | Acrylonitrile-acrylamide-methyl acrylate copolymer | 6:3:2 | 80 | 5:3:2 | 17 | 92:4:3.7:0.3 | 3.70 |
| Example 14 | Acrylonitrile-acrylamide-methyl acrylate copolymer | 6:3:2 | 80 | 5:3:2 | 17 | 92:4:3.6:0.4 | 3.60 |
| Example 15 | Acrylonitrile-acrylamide-methyl acrylate copolymer | 6:3:2 | 80 | 5:3:2 | 17 | 92:4:3.5:0.5 | 3.50 |
| Example 16 | Acrylonitrile-acrylamide-methyl acrylate copolymer | 6:3:2 | 80 | 5:3:2 | 17 | 92:4:3.3:0.7 | 3.30 |
| Example 17 | Acrylonitrile-acrylamide-methyl acrylate copolymer | 6:3:2 | 70 | 5:3:2 | 17 | 92:4:3.8:0.2 | 3.80 |
| Example 18 | Acrylonitrile-acrylamide-methyl acrylate copolymer | 6:3:2 | 100 | 5:3:2 | 17 | 92:4:3.8:0.2 | 3.80 |
| Example 19 | Acrylonitrile-acrylamide-methyl acrylate copolymer | 6:3:2 | 60 | 5:3:2 | 17 | 92:4:3.8:0.2 | 3.80 |
| Example 20 | Acrylonitrile-acrylamide-methyl acrylate copolymer | 6:3:2 | 110 | 5:3:2 | 17 | 92:4:3.8:0.2 | 3.80 |
| Example 21 | Acrylonitrile-acrylamide-methyl acrylate copolymer | 6:3:2 | 80 | 5:3:2 | 10 | 92:4:3.8:0.2 | 3.80 |
| Example 22 | Acrylonitrile-acrylamide-methyl acrylate copolymer | 6:3:2 | 80 | 5:3:2 | 25 | 92:4:3.8:0.2 | 3.80 |

TABLE 1-continued

| Parameters and performance test results of examples 1-24 and comparative example 1 ratio | | | | | | | |
|---|---|---|---|---|---|---|---|
| Example 23 | Acrylonitrile-acrylamide-methyl acrylate copolymer | 6:3:2 | 80 | 5:3:2 | 5 | 92:4:3.8:0.2 | 3.80 |
| Example 24 | Acrylonitrile-acrylamide-methyl acrylate copolymer | 6:3:2 | 80 | 5:3:2 | 40 | 92:4:3.8:0.2 | 3.80 |

| No. | Mass content of polymer A-2 (%) | Mass content of positive electrode active substance (%) | Fluidity | Viscosity/ mPa · s | Filterability | DCR increase rate (%) | Adhesive force (N/m) |
|---|---|---|---|---|---|---|---|
| Example 1 | 0 | 95.80 | NG | / | NG | 132% | 6.8 |
| Example 2 | 0 | 95.60 | OK | 50000 | NG | 104.5% | 10.2 |
| Example 3 | 0 | 93.00 | OK | 47000 | NG | 98% | 10.5 |
| Example 4 | 0 | 92.50 | OK | 42000 | NG | 99% | 11.2 |
| Example 5 | 0 | 92.00 | OK | 38000 | NG | 101% | 14.9 |
| Example 6 | 0 | 91.50 | OK | 35000 | NG | 103% | 23.7 |
| Example 7 | 0 | 91.00 | OK | 30000 | NG | 105% | 32.6 |
| Example 8 | 0 | 90.50 | OK | 28000 | NG | 107% | 36.2 |
| Example 9 | 0 | 90.00 | OK | 24000 | NG | 129% | 39.4 |
| Example 10 | 0.05 | 92.00 | ok | 35000 | OK | 97.1% | 13.5 |
| Example 11 | 0.1 | 92.00 | OK | 30000 | OK | 98% | 15.7 |
| Example 12 | 0.2 | 92.00 | OK | 21000 | OK | 101% | 16.5 |
| Example 13 | 0.3 | 92.00 | OK | 15000 | OK | 103% | 17.4 |
| Example 14 | 0.4 | 92.00 | 0K | 9000 | OK | 105% | 18.9 |
| Example 15 | 0.5 | 92.00 | 0K | 5000 | OK | 108% | 19.8 |
| Example 16 | 0.7 | 92.00 | OK | 2700 | OK | 127% | 21.4 |
| Example 17 | 0.2 | 92.00 | OK | 19000 | OK | 104% | 14.7 |
| Example 18 | 0.2 | 92.40 | OK | 23000 | OK | 105% | 17.8 |
| Example 19 | 0.2 | 92.40 | OK | 17500 | OK | 110% | 12.9 |
| Example 20 | 0.2 | 92.40 | OK | 25800 | OK | 108% | 20.1 |
| Example 21 | 0.2 | 92.40 | OK | 35000 | OK | 102% | 16.9 |
| Example 22 | 0.2 | 92.40 | OK | 32000 | OK | 103% | 17.2 |
| Example 23 | 0.2 | 92.40 | OK | 23500 | NG | 128% | 17.9 |
| Example 24 | 0.2 | 92.40 | OK | 24200 | NG | 130% | 19.0 |

TABLE 1-continued

Parameters and performance test results of examples 1-24 and comparative example 1 ratio

| No. | Composition of binder | Weight average molecular weight (10,000) | Mass ratio of positive electrode active substance LFP:conductive agent SP:binder | Mass content of binder (%) | Mass content of positive electrode active substance (%) | Fluidity | Viscosity/ mPa · s | Filterability | DCR increase rate (%) | Adhesive force (N/m) |
|---|---|---|---|---|---|---|---|---|---|---|
| Comparative Example 1 | PVDF | 70 | 92:4:4 | 4 | 92.00 | NG | / | NG | 100% | 10 |

Note:
"/" in the table means that the viscosity is overrange and cannot be obtained by testing.

TABLE 2

Parameters and performance test results of examples 25-30 and comparative examples 2-3

| | Primer coating layer | | Positive electrode film | | Performance | | | | |
| | | | | Positive electrode active substance:conductive agent SP:polymer A-1:polymer A-2 | | | | | |
| Group | Polymer A-3 | Mass content of polymer A-3 in primer coating layer (%) | Positive electrode active substance | | Appearance of electrode plate | Adhesive force of electrode plate (N/m) | Brittleness of electrode plate | DCR (%) | Number of cycles |
|---|---|---|---|---|---|---|---|---|---|
| Example 25 | Acrylonitrile-acrylamide-methyl acrylate copolymer | 7.89 | LFP | 92:4:3.8:0.2 | Slight crack | 17.9 | Break after folding once | 70% | 3000 |
| Example 26 | Acrylonitrile-acrylamide-methyl acrylate copolymer | 11.76 | LFP | 92:4:3.8:0.2 | Slight crack | 29.5 | Break after folding once | 72% | 3600 |
| Example 27 | Acrylonitrile-acrylamide-methyl acrylate copolymer | 16.67 | LFP | 92:4:3.8:0.2 | OK | 35.3 | Break after folding 4 times | 75% | 4000 |
| Example 28 | Acrylonitrile-acrylamide-methyl acrylate copolymer | 23.08 | LFP | 92:4:3.8:0.2 | OK | 38.2 | Break after folding 6 times | 110% | 2000 |
| Example 29 | Acrylonitrile-acrylamide-methyl acrylate copolymer | 31.81 | LFP | 92:4:3.8:0.2 | OK | 51 | Still no break after folding 8 times | 140% | 1200 |
| Example 30 | Acrylonitrile-acrylamide-methyl acrylate copolymer | 16.67 | NCM:LFP82:10 | 92:4:3.8:0.2 | OK | 18.3 | Break after folding 2 times | 98% | 1800 |
| Comparative example 2 | — | — | LFP | 92:4:3.8:0.2 | Slight crack | 16.5 | Break after folding once | 100% | 1100 |
| Comparative example 3 | Polyacrylic acid | 16.67 | LFP | 92:4:3.8:0.2 | Slight crack | 16.9 | Break after folding once | 107% | 1200 |

According to the above results, it can be seen that in comparative example 1, as PVDF is used as a binder in the positive electrode slurry, the positive electrode active substance in the positive electrode slurry is prone to agglomeration, the stability and processability of the positive electrode slurry are poor, and it is difficult to produce high-quality positive electrode plates, the growth rate of the internal resistance of the battery is further increased after cycling.

Examples 1-24 provide a positive electrode slurry, which comprises a positive electrode active substance, a conductive agent and a binder, wherein the binder comprises a polymer A, and the polymer A comprises a structural unit derived from acrylonitrile, a structural unit derived from acrylamide and a structural unit derived from methyl acrylate. It can be seen from the comparison of example 5 with comparative example 1 that the polymer A has achieved good effects as a binder in the positive electrode slurry, including: improving the stability and processability of the positive electrode slurry, and increasing the adhesive performance of the electrode plate.

The binders in examples 1-18 and 21-24 comprise a polymer A-1 with a weight average molecular weight of 700,000-1,000,000. Compared with the polymer A-1 with a weight average molecular weight of 600,000 or 1,100,000 in examples 19 and 20, they all achieve better effects, including: improving the stability and processability of the positive electrode slurry and the adhesive performance of the electrode plate, and further reducing the growth rate of the cyclic internal resistance of the battery.

The binder in examples 10-24 further comprises a polymer A-2 with a weight average molecular weight of 100,000-250,000. Compared with example 5, the polymer A-2 plays the role of a dispersant in the slurry due to its small molecular weight. The addition of the polymer A-2 further improves the stability and processability of the slurry and the adhesive performance of the electrode plate, while reducing the growth rate of the cyclic internal resistance of the battery.

In examples 2-8 and 10-24, the mass content of the polymer A-1 is 0.4%-5.5%, based on the total mass of the positive electrode active substance, the conductive agent and the binder. Compared with examples 1 and 9, the polymer A-1 within this range improves the stability and processability of the slurry and the adhesive performance of the electrode plate, and greatly reduces the growth rate of the cyclic internal resistance of the battery at the same time.

In examples 10-15, the mass content of the polymer A-2 is 0.05%-0.5%, based on the total mass of the positive electrode active substance, the conductive agent and the binder. Compared with example 16, the addition of the polymer A-2 within this range improves the stability and processability of the slurry and the adhesive performance of the electrode plate, and greatly reduces the growth rate of the cyclic internal resistance of the battery at the same time.

Examples 25-30 provide a positive electrode plate, comprising a current collector, a primer coating layer provided on one surface of the current collector, and a positive electrode film provided on the primer coating layer, wherein the primer coating layer comprises a polymer A-3 soluble in an aqueous solvent, and the polymer A-3 comprises a structural unit derived from acrylonitrile, a structural unit derived from acrylamide, and a structure unit derived from methyl acrylate. Compared with comparative examples 2-3, the appearance quality and brittleness of the electrode plate are improved, and the adhesive performance of the electrode plate and the cycling performance of the battery are greatly increased by providing the primer coating layer.

In examples 25-30, the mass content of the polymer A-3 in the primer coating layer is 5%-40%, based on the total mass of the primer coating layer. Compared with comparative examples 2-3, the appearance quality and brittleness of the electrode plates in theses examples are improved, and the adhesive performance of the electrode plates and the cycling performance of the batteries are increased. When the mass content of the polymer A-3 in the primer coating layer is 5%-30% or 5%-20%, based on the total mass of the primer coating layer, the cycling performance of the battery is greatly increased.

In examples 25-30, the positive electrode film comprises a positive electrode active substance, a binder and a conductive agent. The binder comprises a polymer A-1 and a polymer A-2, and the polymer A-1 and the polymer A-2 comprise a structural unit derived from acrylonitrile, a structural unit derived from acrylamide and a structural unit derived from methyl acrylate.

It should be noted that the present application is not limited to the above embodiments. The above embodiments are exemplary only, and any embodiment that has substantially the same constitutions as the technical ideas and has the same effects within the scope of the technical solution of the present application falls within the technical scope of the present application. In addition, without departing from the gist of the present application, various modifications that may be conceived by those skilled in the art to the embodiments, and other modes constructed by combining some of the constituent elements of the embodiments also fall within the scope of the present application.

What is claimed is:

1. A positive electrode slurry, comprising a positive electrode active substance, a conductive agent and a binder, wherein the binder comprises a polymer A-1 and a polymer A-2, and the polymer A-1 and a polymer A-2 each comprise a structural unit derived from a monomer containing a cyano group, a structural unit derived from a monomer containing an amide group, and a structure unit derived from a monomer containing an ester group, in the polymer A-1 and the polymer A-2, a molar content of the structural unit derived from a monomer containing a cyano group is 50%-70%, a molar content of the structural unit derived from a monomer containing an ester group is 10%-30%, and a molar content of the structural unit derived from a monomer containing an amide group is 10%-30%, based on a total molar content of the structural units in the polymer A-1 and the polymer A-2, the binder comprises the polymer A-1 with a weight average molecular weight of $7\times10^5$-$1\times10^6$ and the polymer A-2 with a weight average molecular weight of $1\times10^5$-$2.5\times10^5$, a unit of the weight average molecular weight is g/mol, based on a total mass of the positive electrode active substance, the conductive agent and the binder, a mass content of the polymer A-1 with a weight average molecular weight of $7\times10^5$-$1\times10^6$ is 0.4%-5.5%, the mass content of the polymer A-2 with a weight average molecular weight of $1\times10^5$-$2.5\times10^5$ is 0.05%-0.5%.

2. The positive electrode slurry according to claim 1, wherein the monomer containing a cyano group is selected from one or more of acrylonitrile and crotonitrile.

3. The positive electrode slurry according to claim 1, wherein the monomer containing an amide group is selected from one or more of methacrylamide, N-methyl methacrylamide, N-ethyl methacrylamide, N-n-propyl methacrylamide, N-isopropyl methacrylamide, N-n-butyl methacrylamide, N-isobutyl methacrylamide, N,N-dimethyl acrylamide, N,N-dimethyl methacrylamide, N,N-diethyl acrylamide and N,N-diethyl methacrylamide.

4. The positive electrode slurry according to claim 1, wherein the monomer containing an ester group is selected from one or more of methyl acrylate, ethyl acrylate, butyl acrylate, isoamyl acrylate, isooctyl acrylate, methyl methacrylate, ethyl methacrylate, hydroxyethyl acrylate and hydroxypropyl acrylate.

5. The positive electrode slurry according to claim 1, wherein in the polymer A-1 and the polymer A-2, the molar content of the structural unit derived from a monomer containing a cyano group is 50%-60%, the molar content of the structural unit derived from a monomer containing an ester group is 10%-20%, and the molar content of the structural unit derived from a monomer containing an amide group is 20%-30%, based on the total molar content of the structural units in the polymer A-1 and the polymer A-2.

6. The positive electrode slurry according to claim 1, wherein the positive electrode active substance is at least one of lithium ferrous phosphate, doped and modified materials thereof, conductive carbon-coated modified materials thereof, conductive metal-coated modified materials thereof, conductive polymer-coated modified materials thereof, or mixtures thereof with other transition metal oxides containing lithium.

7. The positive electrode slurry according to claim 1, wherein the mass content of the positive electrode active substance is 70%-99.5%, based on the total mass of the positive electrode active substance, the conductive agent and the binder.

8. The positive electrode slurry according to claim 1, wherein the conductive agent is selected from one or more of acetylene black, carbon black, Ketjen black, carbon nanotubes, graphene, and carbon nanofibers.

9. The positive electrode slurry according to claim 1, wherein the mass content of the conductive agent is 0.2%-6.0%, based on the total mass of the positive electrode active substance, the conductive agent and the binder.

10. A secondary battery, comprising an electrode assembly and an electrolyte solution, wherein the electrode assembly includes a positive electrode plate, a separator and a negative electrode plate, and the positive electrode plate is prepared from a positive electrode slurry according to claim 1.

11. A battery module, comprising a secondary battery according to claim 10.

12. A battery pack, comprising a battery module according to claim 11.

13. A power consuming device, comprising at least one selected from a secondary battery according to claim 10.

14. The positive electrode slurry according to claim 1, wherein the polymer A-1 and the polymer A-2 are one or more selected from acrylonitrile-acrylamide-ethyl acrylate copolymer, acrylonitrile-acrylamide-propyl acrylate copolymer, and acrylonitrile-acrylamide-isooctyl acrylate copolymer.

15. The positive electrode slurry according to claim 1, wherein the monomer containing a cyano group is crotonitrile.

16. The positive electrode slurry according to claim 1, wherein the monomer containing an amide group is selected from one or more of N,N-dimethyl acrylamide, N,N-dimethyl methacrylamide, N,N-diethyl acrylamide and N,N-diethyl methacrylamide.

* * * * *